April 11, 1950     A. G. SMITH     2,503,973
AIR INTAKE ARRANGEMENT FOR SUPERSONIC AIRCRAFT
Filed Jan. 29, 1946
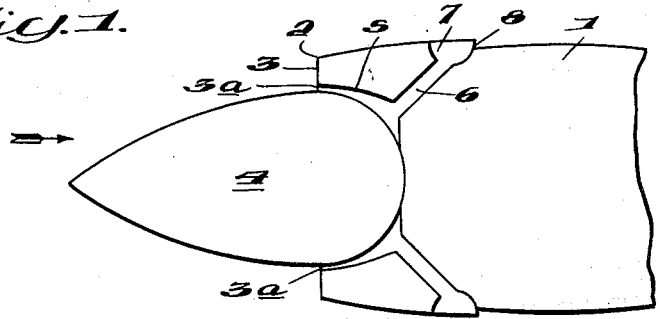
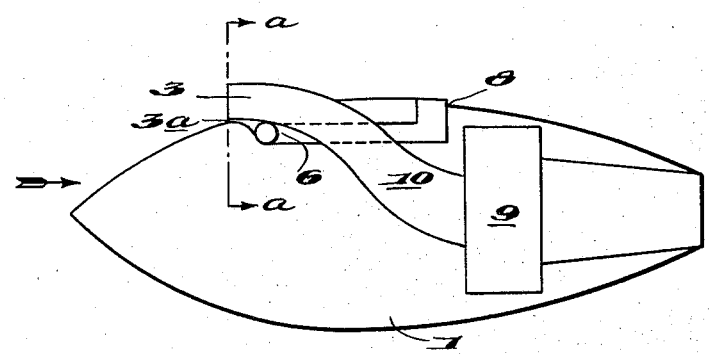
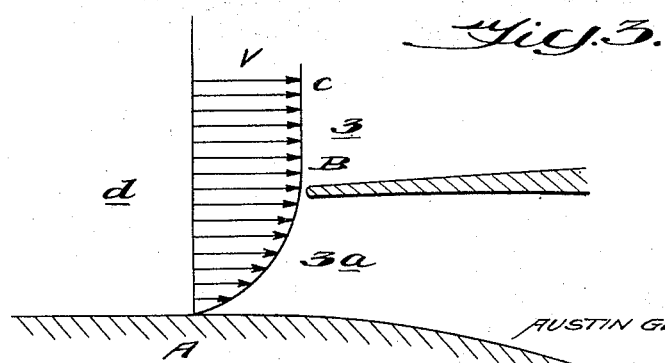
INVENTOR.
AUSTIN GEOFFREY SMITH,
ATTORNEY Patented Apr. 11, 1950

2,503,973

UNITED STATES PATENT OFFICE 2,503,973

AIR INTAKE ARRANGEMENT FOR SUPERSONIC AIRCRAFT

Austin Geoffrey Smith, Blaby, England, assignor to Power Jets (Research & Development) Limited, London, England Application January 29, 1946, Serial No. 644,121
In Great Britain February 1, 1945

4 Claims. (Cl. 244—53)

This invention relates to duct intakes or entries for gaseous fluid flow diffuser systems which operate in supersonic velocity conditions, by which is meant in this specification and the appended claims, entries at or in the region of which there is formed in the flow, in the course of its entering the diffuser system, a "shock wave" represented by a large and more or less instantaneous change of pressure at the junction of contiguous zones of the flow at either side of which the flow velocities are more or less instantaneously changed in such a fashion that the velocity components upstream and downstream of and normal to the shock and determined under the local conditions, are respectively supersonic and subsonic or, in other words, that the component Mach numbers at the points in question are respectively greater and less than unity, the Mach number being the ratio of the velocity of the fluid to the velocity of sound at the same point relative to the fluid. The invention is concerned with such entries of the kind in which it is required that at least a part of the boundary surface of the entry extends upstream therefrom, so that problems associated with the existence of a boundary layer arise.

The invention has application both to the case in which the approach relative velocity as well as the entry velocity or component velocity is supersonic, and that in which the approach relative velocity is subsonic whilst the component velocity in a zone affecting conditions at the entry is supersonic, it being the velocity in or in the region of the entry that is the material factor from the point of view of the invention. The invention further has application to the case in which the diffusion takes place from one supersonic velocity to a lower supersonic velocity, provided that shock waves occur.

An example of application of the invention which may serve to illustrate its object is to be found in the case of an aircraft intended for flight at supersonic velocity in which it is necessary to have a forwardly facing air intake or entry, for example for the supply of an engine, of which part of the boundary surface extends further upstream than a remaining part. Pursuing the example, an aircraft may be required to have an annular air duct entry, facing forward, and surrounding a streamlined body which is in effect a solid of rotation about an axis coinciding with the flight path; in such a case the wall of this body is a boundary surface extending forwards from the region of the entry, the other boundary surface being the outer annular structure defining the entry.

The formation of a shock wave at the junction of zones in which the velocity components normal to the shock are respectively supersonic and subsonic has now been established to be a serious factor in the operation of a duct entry of the kind referred to. Thus, for optimum efficiency of operation of the duct, at least in conditions giving a Mach number of up to 1.5 to 1.8, the arrangement should be such that the shock wave is normal (i. e. at right angles to the relative fluid flow) and is positioned as nearly as possible in the plane of the entry to the duct. In practice, however, it has now been established that with an entry of the kind referred to there is mutual interference between the shock wave and the low velocity so-called "boundary layer" of fluid present on the forwardly extending surface of the entry, the result of which is not only to cause disturbance of the fluid stream in the duct and its separation from the wall of the duct, but also to render it impossible to maintain the location of the shock wave at any given position.

An object of the invention is to mitigate the difficulties described in the foregoing, to which end the invention contemplates the provision, in a duct entry of the kind described, of a forwardly facing boundary layer bleed aperture in the region of the position at which it is desired that the shock wave should form, and which will usually be at or in the near vicinity of the entry. By the expression "forwardly facing," it is intended to convey that the plane of the entry is to extend across the line of the relative flow, but not necessarily at right angles thereto.

The boundary layer bleed, as its name implies, and to which some means of abstraction of airflow may be applied, is to be arranged to abstract fluid from the so called boundary layer of fluid formed adjacent to the forwardly extending wall of the entry. In general, the intention is that the spacing of the partition from the upstream extending surface, ideally, should be such as to afford a passage or slot of just sufficient depth to accept the whole of the boundary layer but not that of the main flow. The depthwise dimension is not, however, considered to be highly critical and some departure from the ideal is permissible. It will be appreciated that, as the term "boundary layer" does not represent an exact conception, it is impossible to define it with precision; the term is, however, well understood in the art and for the purpose of the invention may be regarded as the region in which, at successive points in a direction normal to the entry wall, there is an appreciable change in the relative velocity of the flow due to viscous drag on the upstream boundary surface. To those skilled in the art a common measure of the extent of this region is that defining it as the 99% displacement thickness.

It is to be understood that, whilst the application of the invention primarily contemplated is to air flow, more particularly in aircraft, the same considerations apply to the flow of other gaseous fluids.

Further to explain the underlying idea of the invention it may be mentioned that whereas a boundary layer bleed, as frequently understood, may consist of a passage in a surface, the direction of entry to which is at right-angles to the direction of flow, such a bleed is not applicable in the circumstances in which the present invention is applied. If such a passage entry were sought to be applied in the locality of the shock-wave, it would be found that the very steep pressure gradient constituted by the shock-wave would merely result in the streamline or flow of high-pressure fluid at the rear of the wave passing into the bleed entry and returning out of it again into the low-pressure side of the wave. It is thus regarded as essential to the present invention that the bleed entry should be forwardly facing, that the partition defining the bleed aperture with the boundary surface extends at least as far upstream as the main entry, and that when a shock wave is formed in the main entry, it will be seated on the partition which defines the bleed aperture.

For the better understanding of the invention, reference will now be made to the examples of application illustrated in the accompanying drawings, in which:

Figure 1 is a diagrammatic sectional elevation of the nose portion of an aircraft designed for flight at supersonic velocities and having the invention applied thereto;

Figure 2 is a diagrammatic sectional elevation of an engine nacelle having a scoop-type air duct embodying the invention;

Figure 2a is a detail taken on line a—a of Figure 2 to show the frontal aspect of the duct entry;

Figure 3 is an enlarged diagrammatic view showing a forwardly facing bleed aperture in longitudinal section and also embodying a curve of flow velocities $v$ plotted against distance $d$ from the forwardly extending wall of the entry, to illustrate the conception of boundary layer.

Throughout the drawings, like reference numerals indicate like or analogous parts.

In the example illustrated in Figure 1, an aircraft intended for supersonic flight has a fuselage 1 of circular section the skin or shell of which has an annular leading edge 2 to form the outer boundary surface of a main air duct intake 3. Within this fuselage is considered to be installed a gas turbine aero-engine which in its nature requires a high mass flow of air for its operation. Surrounded by the forward edge 2 of the fuselage proper and extending from within the fuselage substantially forward thereof, is a nacelle 4 to accommodate the pilot. The annulus 3 between the leading edge of the fuselage and the wall of the nacelle is the entry in question. The rear of the nacelle 4 is surrounded by a partition 5 defining annular duct, the leading edge of the partition being in the plane of the entry 3. There is thus defined a forwardly facing bleed aperture 3a and channels 6 are provided for conducting air entering said aperture 3a to a suitable point of low pressure, in this case an annular chamber 7 having an outlet 8 to a low pressure zone on the skin of the fuselage 1. As is shown in the drawing, the average width of the aperture 3a is less than one half the average width of the entry 3, measured in the plane of the drawing.

In the case of Figures 2 and 2a, the invention has been applied to an engine nacelle 1 containing a jet-propulsion gas turbine power unit 9 receiving its air supply through a duct 10 having a scoop-type entry 3 illustrated in frontal aspect in Figure 2a. The inner wall of the duct 10 acts as a partition which, with the forwardly extending skin of the nacelle 1, defines a forwardly facing bleed aperture 3a which communicates by way of a channel 6 with an outlet 8 to a low pressure zone on the skin of the nacelle 1. As is shown in the drawing, the average width of the bleed aperture 3a is less than one half the average width of the entry 3, measured in the plane of the drawing.

Ideally, the depth of the bleed aperture 3a should be such as to abstract substantially not less than the whole of what may be properly regarded as the boundary layer fluid, and in some cases it may be advantageous to abstract more. The depth of the boundary layer will, of course, vary in different cases, but (referring to Figure 3) if the curve A, B, C, be taken to represent velocity $v$ plotted against distance $d$ from the inner wall of the entry, then the point B at which there ceases to be any significant variation of velocity with increasing distance represents the lowest desirable level at which the depth of the bleed aperture 3a should be put.

Although in the foregoing the invention has been considered in its specific application to arrangements in which the true velocities vary from supersonic to subsonic, a bleed aperture in accordance with the invention may also be usefully employed in or near an intake at which there is a shock wave accompanying a change of the component velocity from supersonic to subsonic, notwithstanding that the true velocity remains supersonic.

I claim:

1. In an aircraft for operation under conditions involving supersonic velocity flow, a wall having a boundary surface along which said flow passes, a second wall having an upstream edge disposed transversely to the direction of flow and defining with said first wall a fluid intake opening, and partition means defining with said surface a fluid bleed aperture of substantially smaller cross sectional area than said opening for receiving only substantially the entire boundary layer of fluid formed on said boundary surface, said bleed aperture facing upstream in the sense that the upstream edge of said partition means is coextensive with the upstream edge of said second wall, each point on said edge of the partition means lying at least as far upstream as the corresponding point on said edge of said second wall, and in the sense that a plane normal to the direction of main air flow through the intake opening and cutting the edge of the partition means makes an upstream-facing angle of at least 90° with the boundary surface, the average width of said bleed aperture measured from said boundary surface to said partition means and perpendicular to the direction of fluid flow to said opening being less than one half the average width of the air intake opening measured from said partition means to said second wall and perpendicular to the direction of fluid flow to said opening, the arrangement thereby being such that a shock wave normal to the main flow into the intake opening will be seated on said partition means so long as the shock wave is located at said opening, and will be presented from extending into said bleed aperture.

2. The structure as set forth in claim 1, the leading edges of said partition means and of said second wall extending in a direction normal to the direction of fluid flow to said fluid intake opening.

3. The structure as set forth in claim 1, said first wall being a streamline nose portion of the aircraft, said second wall comprising an annular shell about said nose, the upstream edge of said shell and the upstream edge of said partition means each being disposed in a plane normal to the direction of fluid flow to said fluid intake opening.

4. The structure as set forth in claim 1, said first wall being a streamline nose portion of the aircraft, said second wall comprising a scoop projecting laterally from said nose, the upstream edge of said scoop and the upstream edge of said partition means each being disposed in a plane normal to the direction of fluid flow to said fluid intake opening.

AUSTIN GEOFFREY SMITH.

REFERENCES CITED

The following references are of record in the file of this patent:

UNITED STATES PATENTS

| Number | Name | Date |
| --- | --- | --- |
| 2,214,723 | Holland | Sept. 10, 1940 |

FOREIGN PATENTS

| Number | Country | Date |
| --- | --- | --- |
| 377,424 | Italy | Dec. 16, 1939 |

OTHER REFERENCES

Jane's All the World's Aircraft, 1943–44, page 106c.

"ME109F," article in "Aircraft Engineering," Mar. 1942, page 74.